US00RE43644E

(19) United States
(12) Reissued Patent
Shiraki et al.

(10) Patent Number: US RE43,644 E
(45) Date of Reissued Patent: *Sep. 11, 2012

(54) LENS DRIVING APPARATUS

(75) Inventors: Manabu Shiraki, Kanagawa (JP); Naoki Sekiguchi, Kanagawa (JP)

(73) Assignees: Shicoh Co., Ltd., Kanagawa (JP); Shicoh Motor (Shanghai) Co., Ltd., Shanghai (CN)

( * ) Notice: This patent is subject to a terminal disclaimer.

(21) Appl. No.: 13/012,290

(22) Filed: Jan. 24, 2011

Related U.S. Patent Documents

Reissue of:
(64) Patent No.: 7,649,703
Issued: Jan. 19, 2010
Appl. No.: 11/346,233
Filed: Feb. 3, 2006
U.S. Applications:
(62) Division of application No. 12/853,559, filed on Aug. 10, 2010, now Pat. No. 7,649,703.

(30) Foreign Application Priority Data

Oct. 21, 2005 (JP) ..... 2005-306933
Nov. 14, 2005 (JP) ..... 2005-328433

(51) Int. Cl.
*G02B 7/02* (2006.01)
*G11B 7/00* (2006.01)
*G03B 13/00* (2006.01)
*G03B 13/34* (2006.01)

(52) U.S. Cl. ..... 359/824; 359/814; 369/44.14; 369/44.22; 369/147; 348/335; 348/345; 310/12; 310/14; 396/133

(58) Field of Classification Search ..... 359/811, 359/813, 814, 823, 824, 676; 348/335, 345, 348/E5.024, E5.028; 310/12, 12.02, 12.04, 310/12.16, 12.22, 12.32, 14; 369/44.14–44.16, 369/44.22, 115, 147; 720/683; 29/428
See application file for complete search history.

(56) References Cited

U.S. PATENT DOCUMENTS 5,105,405 A 4/1992 Hashimoto et al. ..... 369/44.22
(Continued)

FOREIGN PATENT DOCUMENTS

JP 8-94904 4/1996
(Continued)

*Primary Examiner* — Loha Ben
(74) *Attorney, Agent, or Firm* — Wenderoth, Lind & Ponack, L.L.P.

(57) ABSTRACT

A lens driving apparatus 1 of the present invention includes a substantially cylindrical yoke 3; a base 5 to which the yoke 3 is attached; a carrier 7 having a lens; a coil 10; and a magnet 13, wherein the carrier 7 is moved in a direction of an optical axis of a lens by electromagnetic force generated by passing current through the coil 10, the base 5 is substantially square-shaped as viewed from a plane, the yoke 3 is placed at an inner position of the base 5, the yoke 3 has an outer peripheral wall 3a and an annular inner peripheral wall 3b to be spaced to each other, each magnet is placed between the outer peripheral wall and the inner peripheral wall and at a position corresponding to a base corner portion of the base 5, and a space between the outer peripheral wall 3a and the inner peripheral wall 3b positioned at a base side portion 3e is made narrower than a space between the outer peripheral wall 3a and the inner peripheral wall 3b positioned at the base corner portion.

4 Claims, 8 Drawing Sheets

U.S. PATENT DOCUMENTS

| | | | | |
|---|---|---|---|---|
| 5,499,143 | A * | 3/1996 | Sakamoto et al. | 359/824 |
| 6,195,314 | B1 * | 2/2001 | Inui et al. | 369/44.14 |
| 6,567,352 | B1 * | 5/2003 | Inui et al. | 369/44.21 |
| 6,680,883 | B2 * | 1/2004 | Inui et al. | 369/44.14 |
| 7,271,511 | B2 * | 9/2007 | Osaka | 310/12.27 |
| 7,285,879 | B2 * | 10/2007 | Osaka | 310/12.02 |
| 7,291,942 | B2 * | 11/2007 | Osaka | 310/12.04 |
| 7,295,388 | B2 | 11/2007 | Shyu et al. | 359/814 |
| 7,400,068 | B2 | 7/2008 | Tseng | 310/12.16 |

FOREIGN PATENT DOCUMENTS

| | | |
|---|---|---|
| JP | 2005-128405 | 5/2005 |
| JP | 2007-121853 | 5/2007 |
| JP | 2007-139810 | 6/2007 |
| JP | 2008-58659 | 3/2008 |
| JP | 2008-165032 | 7/2008 |
| JP | 2008-299103 | 12/2008 |
| JP | 2010-15067 | 1/2010 |

* cited by examiner

LENS DRIVING APPARATUS

Matter enclosed in heavy brackets [ ] appears in the original patent but forms no part of this reissue specification; matter printed in italics indicates the additions made by reissue.

*More than one reissue application has been filed for the reissue of U.S. Pat. No. 7,649,703. The reissue applications are the present application; application Ser. No. 13/352,855; and application Ser. No. 12/853,559. The present application and application Ser. No. 13/352,855 are divisional reissue applications of application Ser. No. 12/853,559, filed Aug. 10, 2010, which is a reissue application of U.S. Pat. No. 7,649, 703, issued Jan. 19, 2010.*

BACKGROUND OF THE INVENTION

1. Field of the Invention

The present invention relates to a lens driving apparatus.

2. Description of the Related Art

Unexamined Japanese Patent Publication No. 2004-280031 discloses a lens driving apparatus including a substantially cylindrical yoke, a base to which the yoke is attached, a carrier that holds a lens, a coil, and a magnet, wherein current is made to flow to the coil, and thereby the carrier is moved in a direction of an optical axis of the lens. In the above lens driving apparatus, there is disclosed a structure in which the yoke is provided to have a space between an inner peripheral wall and an outer peripheral wall and the ring-shape magnet is provided therebetween in a circumferential direction.

However, in the aforementioned prior art, since the ring-shape magnet is provided between the inner peripheral wall and the outer peripheral wall, the space between the inner peripheral wall and the outer peripheral had to be larger than the thickness of the magnet over the entire circumferential direction. As a result, there was a problem in which the outer dimension of the base was increased to cause difficulty in miniaturizing the lens driving apparatus.

SUMMARY OF THE INVENTION

In view of the aforementioned circumstances, it is an object of the present invention is to provide a lens driving apparatus that reduces a base in an outer size to make it possible to miniaturize the apparatus.

A lens driving apparatus of the present invention includes a substantially cylindrical yoke; a base to which the yoke is attached; a carrier having a lens; a coil; and a magnet, wherein the carrier is moved in a direction of an optical axis of a lens by electromagnetic force generated by passing current through the coil, the base is substantially square-shaped as viewed from a plane, the yoke is placed at an inner position of the base, the yoke has an outer peripheral wall and an inner peripheral wall to be spaced to each other, the inner peripheral wall is annularly shaped, each magnet is placed between the outer peripheral wall and the inner peripheral wall and at a position corresponding to a base corner portion, and a space between the outer peripheral wall and the inner peripheral wall positioned at a base side portion is made narrower than a space between the outer peripheral wall and the inner peripheral wall positioned at the base corner portion.

According to the present invention, each magnet is provided at the position corresponding to each corner portion of the base between the outer peripheral wall and the inner peripheral wall. A space between the outer peripheral wall and the inner peripheral wall, which are positioned at the base side portion, is made narrower than a space between the outer peripheral wall and the inner peripheral wall, which are positioned at the base corner portion. As a result, when the yoke is attached to the base in such a manner that the outer peripheral wall is placed at substantially the same position as the side portion (one side of the square) of the base, the outer dimension of the base, as viewed from the plane, can be reduced by the thickness of the magnet.

In the present invention, preferably, the outer peripheral wall of the yoke is substantially square-shaped as viewed from the plane, the outer peripheral wall has arc-wall portions, being placed at positions corresponding to corner portions of the base and being substantially arc-shaped as viewed from the plane, and a flat wall portion being formed between the arc-wall portions and being flat as viewed from the plane, and a magnet, being arc-shaped as viewed from the plane, is fixed onto an inner peripheral side surface of the arc-wall portion of the outer peripheral wall.

Since the position of the flat wall portion of the yoke substantially coincides with the position of the side portion of the base, a dead space at each corner portion of the base can be made smaller than the case in which the entirety of the outer periphery wall of the yoke is annularly formed. Furthermore, the magnet is provided on the inner peripheral side of the arc wall portion of the outer peripheral wall and no magnet is provided on the inner peripheral side of the flat wall portion. In this condition, for example, when peripheral equipment is provided to be adjacent to the lens driving apparatus, it is possible to increase a distance between the magnet provided on the inner peripheral side of the arc wall portion and the peripheral equipment, thereby making it possible to reduce the influence of the magnetic field of the magnet on the peripheral equipment.

Moreover, in the present invention, preferably, the outer peripheral wall of the yoke is substantially square-shaped as viewed from the plane, and the magnet, being substantially triangularly shaped as viewed from the plane, is fitted into a corner portion of the outer peripheral wall of the yoke.

Since the magnet, which is substantially triangularly shaped as viewed from the plane, is fitted into the corner portion of the outer peripheral wall, a distance between a vertex of the triangle and a side being opposed to the vertex can be increased to make it possible to enhance the magnetic flux density of the magnet while reducing the outer dimension. Moreover, since the magnet, which is substantially triangularly shaped as viewed from the plane, is fitted into the corner portion of the outer peripheral wall, the magnet can be positioned by only fitting the magnet into the corner portion of the outer peripheral wall and the fixture of the magnet can be attained with a simple adhesion.

Furthermore, in the present invention, preferably, the outer peripheral wall of the yoke has an engage projection portion that positions the base.

Since the engage projection portion that positions the base is formed on the outer peripheral wall of the yoke, the yoke can be easily positioned in attaching the yoke to the base, and this facilitates the manufacture.

A lens driving apparatus of the present invention includes a substantially cylindrical yoke; a base to which the yoke is attached; a carrier having a lens; a coil; and a magnet, wherein the carrier is moved in a direction of an optical axis of a lens by electromagnetic force generated by passing current through the coil, the base is substantially square-shaped as viewed from a plane, the yoke is placed at an inner position of the base, the yoke has an outer peripheral wall, being substantially square-shaped as viewed from the plane, and an opening portion, being arc-shaped as viewed from the plane, where the carrier is moved, the magnet, being substantially triangularly shaped as viewed from the plane, is fitted into a corner portion of the outer peripheral wall of the yoke, and an inner wall of the yoke is formed in a standing condition on only an edge of the opening portion where the magnet opposes.

According to the present invention, since the magnet, which is substantially triangularly shaped as viewed from the plane, is fitted into the corner portion of the outer peripheral wall, a distance between the vertex of the triangle and the side being opposed to the vertex can be increased to make it possible to enhance the magnetic flux density of the magnet while reducing the outer dimension. Moreover, since each magnet may not be placed at the base side portion, a space between the outer peripheral wall and the edge of the opening portion, which are positioned at the base side portion, can be made narrower than a space between the outer peripheral wall and the inner side wall, which are positioned at the base corner portion. As a result, the outer dimension of the base can be reduced to make it possible to miniaturize the lens driving apparatus. Furthermore, the arc-shape inner side wall is formed on only the edge of the opening portion where the magnet opposes. On the edge of the opening portion where the outer peripheral wall, on which no magnet is provided, opposes, no inner side wall is formed. As a result, the amount of yokes can be reduced by the portion where no inner side wall is provided, thereby making it possible to achieve light weight and cost reduction.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

The following will specifically explain embodiments of the present invention with reference to the accompanying drawings.

Figure 1:
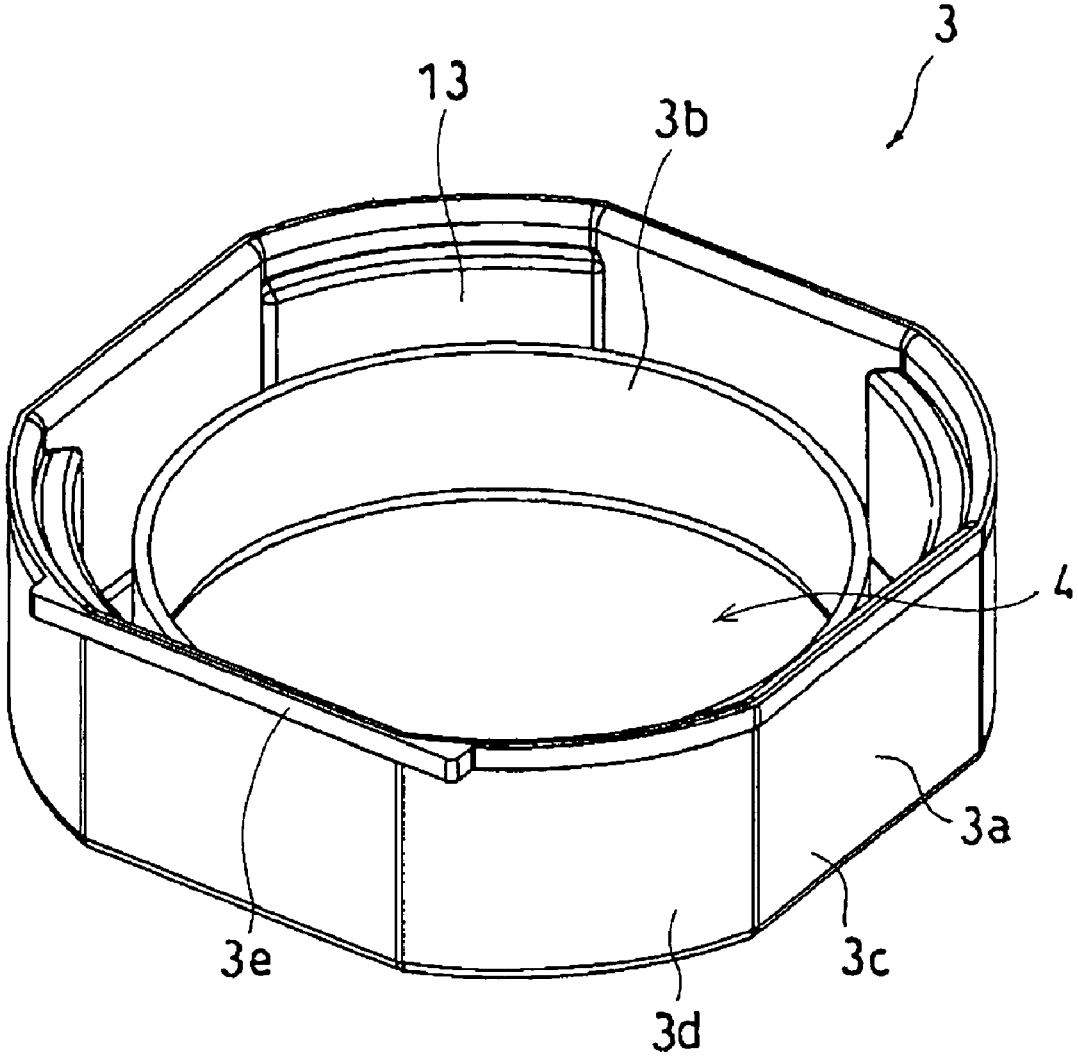
FIG. 1 is a perspective view illustrating a yoke extracted from a lens driving apparatus according to a first embodiment.
Figure 2:
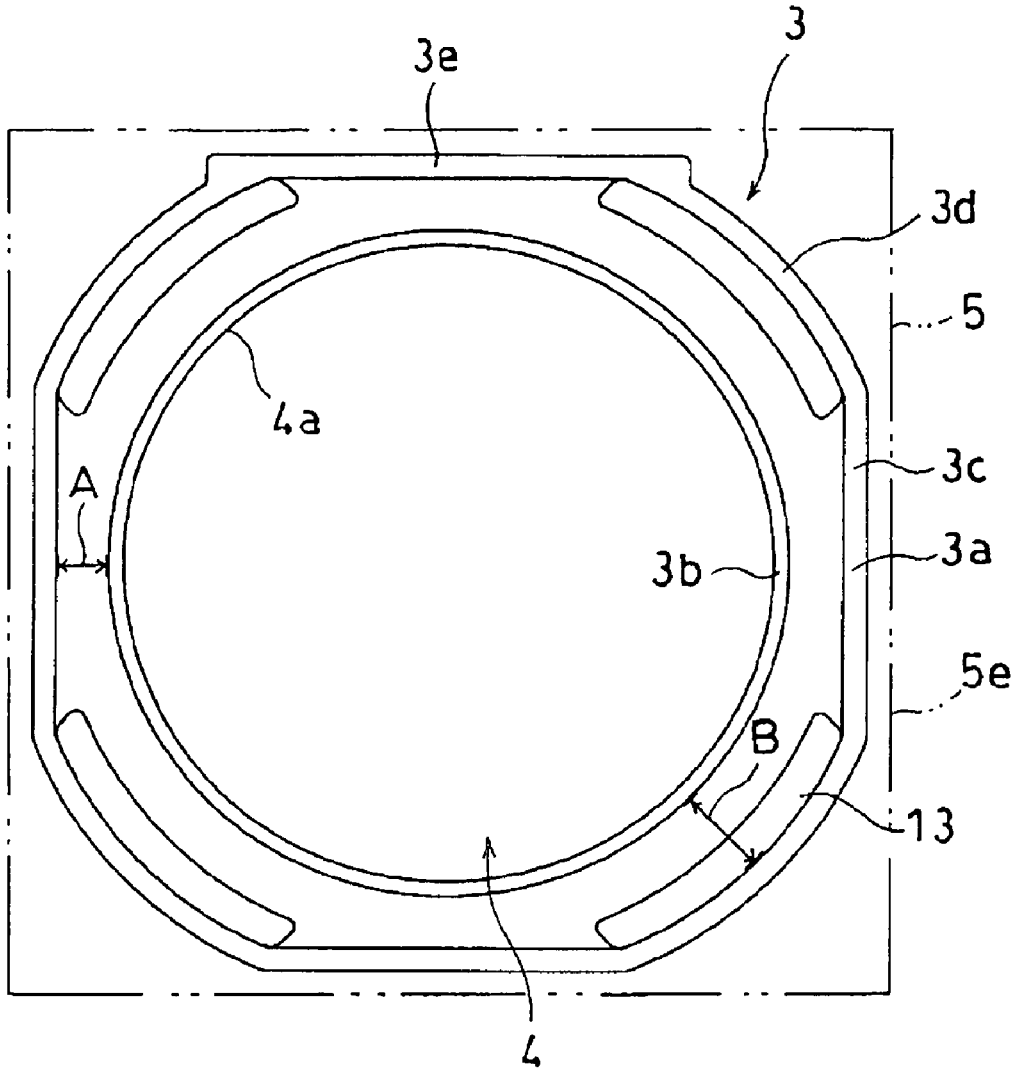
FIG. 2 is a plane view of the yoke illustrated in FIG. 1.
Figure 3:
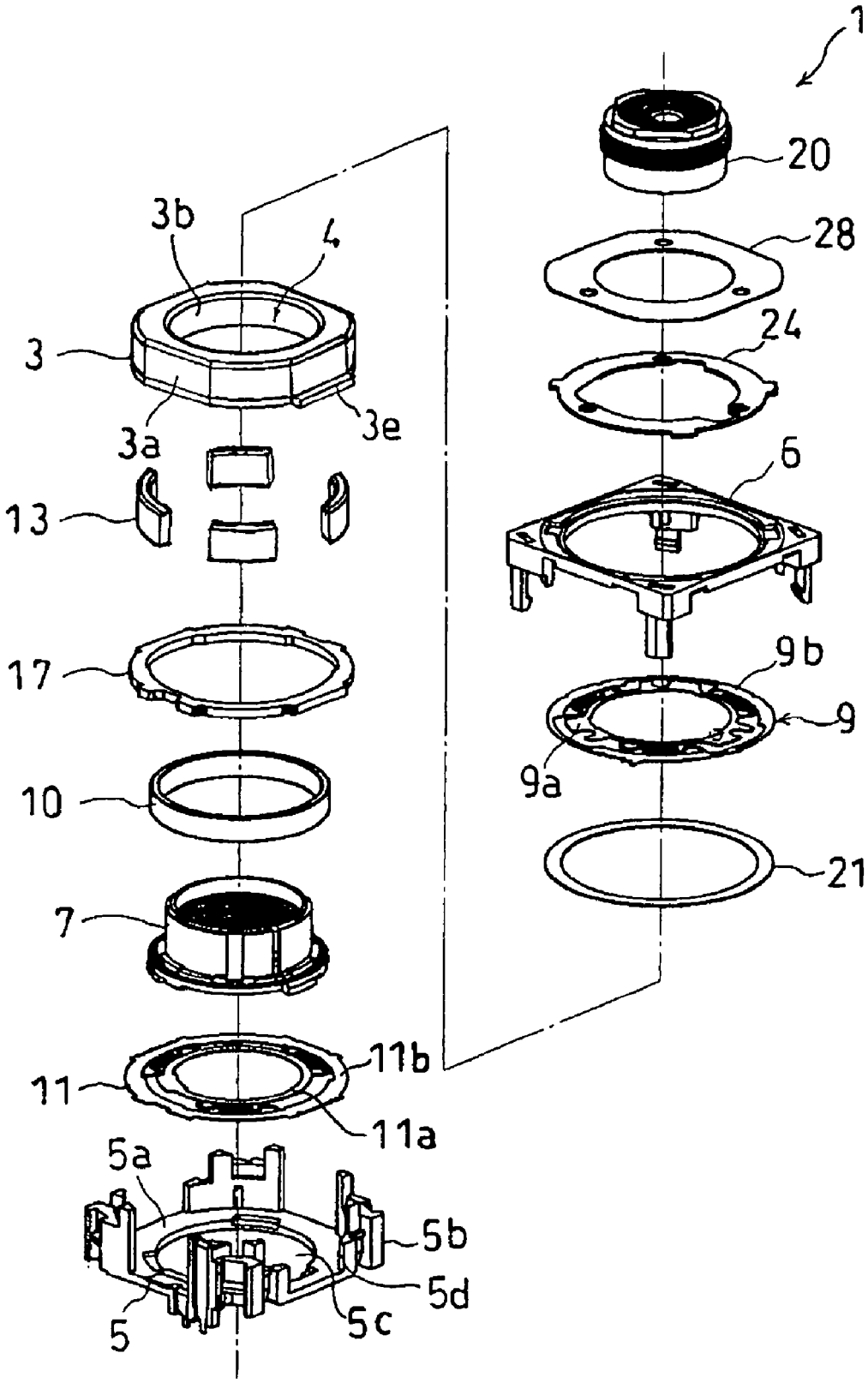
FIG. 3 is an exploded perspective view of the lens driving apparatus according to the first embodiment.
Figure 4:
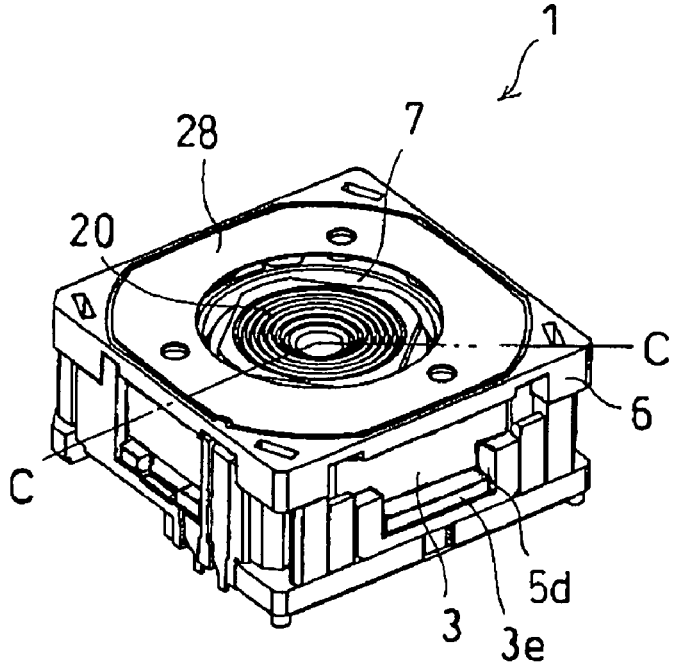
FIG. 4 is a perspective view illustrating the entirety of the lens driving apparatus according to the first embodiment.
Figure 5:
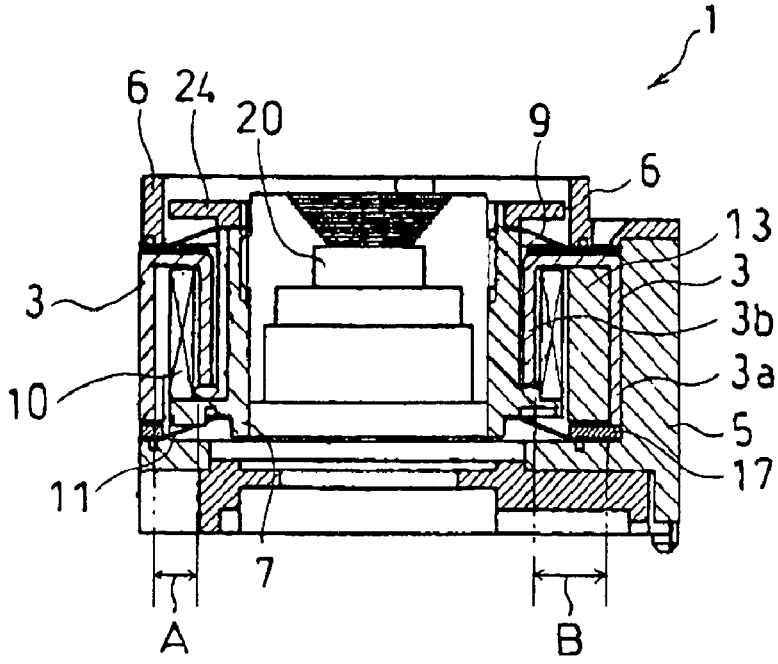
FIG. 5 is a cross-sectional view taken along a line C-C of the lens driving apparatus shown in FIG. 4.

FIG. 1 is a perspective view illustrating a yoke extracted from a lens driving apparatus according to a first embodiment; FIG. 2 is a plane view of the yoke illustrated in FIG. 1; FIG. 3 is an exploded perspective view of the lens driving apparatus according to the first embodiment; FIG. 4 is a perspective view illustrating the entirety of the lens driving apparatus according to the first embodiment; and FIG. 5 is a cross-sectional view taken along a line C-C of the lens driving apparatus shown in FIG. 4.

A lens driving apparatus 1 according to a first embodiment is one that is incorporated into an autofocus lens for a cellular phone and includes a substantially U-shape (in cross-section) yoke 3, a base 5 to which the yoke 3 is attached, a frame 6 that supports the base 5, a cylindrical carrier 7 provided on an inner peripheral side of the yoke 3, a coil 10 provided on an outer peripheral side of the carrier 7, a front spring 9 provided at a front position in a direction of an optical axis of the carrier 7, and a back spring 11 provided at a back position in a direction of the optical axis of the carrier 7.

The base 5 is substantially square-shaped as viewed from the plane, and has a substantially flat base portion 5a and base-side connecting portions 5b formed at four corners of the base portion 5 in a standing condition. The base portion 5a has a circular opening hole 5c and engaging portion 5d that is engaged with engage projection portion 3e formed on the outer peripheral wall 3a of the yoke 3. The frame 6 is substantially square-shaped as viewed from the plane and fitted into the base 5. The outer dimension of the base 5 is about 10 mm×10 mm as viewed from the plane.

The yoke 3 has outer peripheral walls 3a and an annular inner peripheral wall 3b, which are positioned at the inner side of the base 5 and arranged to have a distance there between, and an opening portion 4, where the carrier 7 is moved. An opening portion 4 is circular as viewed from the plane. Each outer peripheral wall 3a is substantially square-shaped seeing from the plane. On the outer peripheral walls 3a, there are alternately formed a flat wall portion 3c and an arc wall portion 3d, which is placed at a position corresponding to each corner of the base 5, in a circumferential direction. An arc magnet 13 is provided on the arc wall portion 3d, which is placed at a corner position of the outer peripheral wall 3a, along the inner peripheral side. In addition, the outer peripheral wall 3a of the yoke 3 has a thickness larger than the inner peripheral wall 3b.

On one side surface of the outer peripheral wall 3a, there is formed the engage projection portion 3e that projects outward from the outer peripheral surface of the outer peripheral wall 3a. The engage projection portion 3e is engaged with the engaging portion 5d of the base 5 to position the yoke 3.

The front spring 9 is a ring-shape flat spring made of metal and includes an inner peripheral portion 9a and an outer peripheral portion 9b. The inner peripheral portion 9a is urged against the outer peripheral portion 9b back and forth, and the inner peripheral portion 9a is fixed to be sandwiched between the carrier 7 and a cover 24 and the outer peripheral portion 9b is fixed to be sandwiched between a front spacer 21 and the frame 6.

The back spring 11 is a ring-shape flat spring made of metal, similar to the front spring 9, and includes an inner peripheral portion 11a and an outer peripheral portion 11b. The inner peripheral portion 11a is urged against the outer peripheral portion 11b back and forth, and the inner peripheral portion 11a is fixed to be sandwiched between the carrier 7 and the base 5 and the outer peripheral portion 11b is fixed to be sandwiched between a back spacer 17 and the base 5.

The metal cover 24 is attached to the front surface of the frame 6 to cover the front spring 9 attached to the frame 6 and the carrier 7. A resin seal material 28 is adhered onto the front surface of the cover 24 to cover the front surface of the cover 24.

Next, an explanation will be given of a function and an effect of the lens driving apparatus according to the present embodiment. Assembly of the lens driving apparatus 1 is made as follows. First, the yoke 3 and the magnets 13 are attached to the base 5. After that, the carrier 7 is attached to the base 5 after the coil 10 and the back spring 11 are attached to the carrier 7. Then, the front spring 9 is attached to the carrier 7 and covered with the frame 6. The cover 24 and the seal material 28 are attached to the front surface of the frame 6, and a lens body 20 is screwed into the carrier 7, so that the assembly of the lens driving apparatus 1 is completed.

In the present embodiment, each magnet 13 is provided at the position corresponding to each corner portion of the base 5 between the outer peripheral wall 3a and the inner peripheral wall 3b. A space (A shown in FIGS. 2 and 5) between the outer peripheral wall 3a and the inner peripheral wall 3b, which are positioned at the base side portion 5e, is made narrower than a space (B shown in FIGS. 2 and 5) between the outer peripheral wall 3a and the inner peripheral wall 3b, which are positioned at the base corner portion. As a result, when the yoke 3 is attached to the base 5 in such a manner that the outer peripheral wall 3a is placed at substantially the same position as the side portion 5e (one side of the square) of the base 5, the outer dimension of the base 5 can be reduced by the thickness of the magnet 13, as viewed from the plane. Accordingly, the outer dimension of the yoke 3 can be reduced as viewed from the plane, thereby making it possible to miniaturize the lens driving apparatus.

Since the position of the flat wall portion 3c of the yoke 3 substantially coincides with the position of the side portion 5e of the base 5, a dead space at each corner portion of the base 5 can be made smaller than the case in which the entirety of the outer periphery wall of the yoke 3 is annularly formed.

The magnet 13 is provided on the inner peripheral side of the arc wall portion 3d of the outer peripheral wall 3a and no magnet 13 is provided on the inner peripheral side of the flat wall portion 3c. In this condition, for example, when peripheral equipment is provided to be adjacent to the lens driving apparatus 1, it is possible to increase a distance between the magnet 13 provided on the inner peripheral side of the arc wall portion 3d and the peripheral equipment, thereby making it possible to reduce the influence of the magnetic field of the magnet 13 on the peripheral equipment (apparatus such as a speaker).

The engage projection portion 3e is formed on the outer peripheral wall 3a of the yoke 3. This makes it possible to easily position the yoke 3 by only fitting the engage projection portion 3e into the engaging portion 5d of the base 5 when the yoke 3 is attached to the base 5.

Although another embodiment will be explained next, in the explanation set forth below, the portions of this embodiment having the same functions and effects as those of the first embodiment are assigned the same reference numerals as those of corresponding portions in the first embodiment, and the explanation is omitted. The following will mainly explain the points different from the first embodiment.

Figure 6:
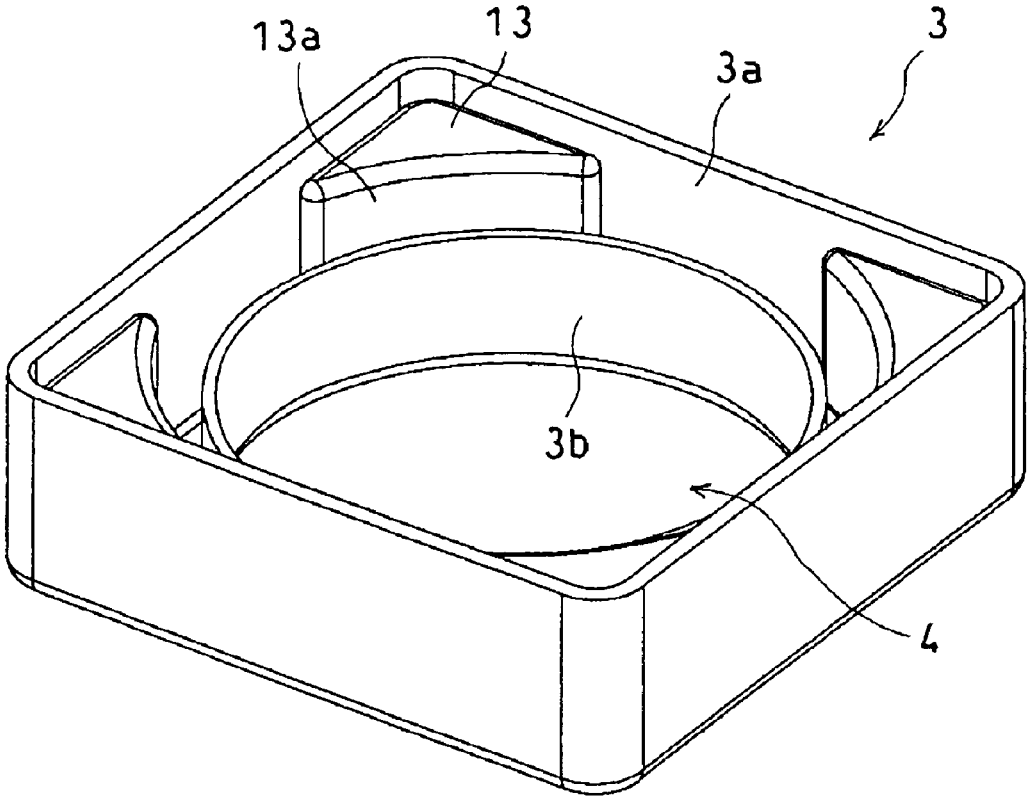
FIG. 6 is a perspective view illustrating a yoke extracted from a lens driving apparatus according to a second embodiment.
Figure 7:
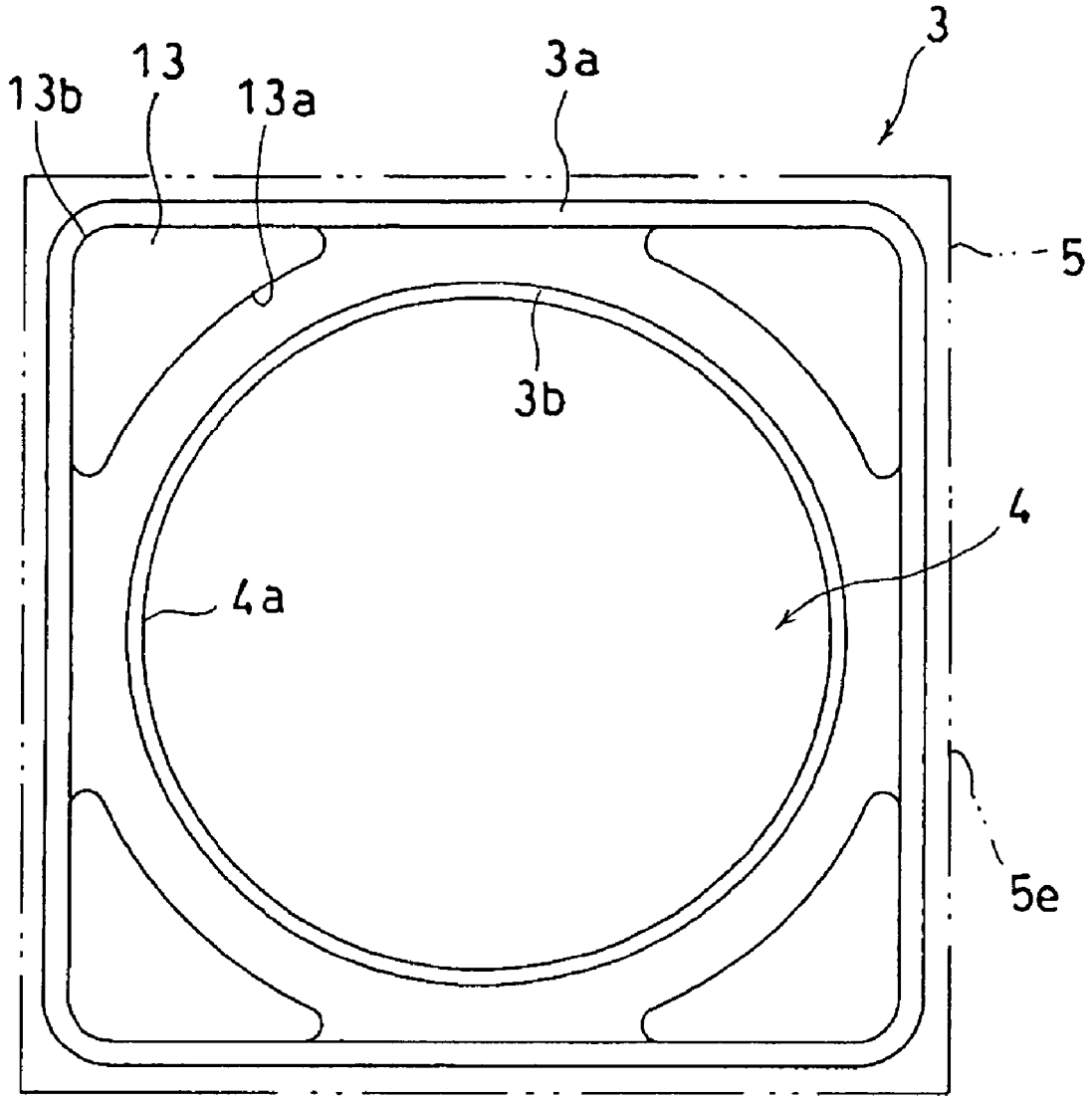
FIG. 7 is a plane view of the yoke illustrated in FIG. 6.

FIG. 6 is a perspective view illustrating a yoke extracted from a lens driving apparatus according to a second embodiment; and FIG. 7 is a plane view of the yoke illustrated in FIG. 6.

As illustrated in FIGS. 6 and 7, the outer peripheral wall 3a of the yoke 3 is substantially square-shaped as viewed from the plane, and the magnet 13, which is substantially triangularly shaped as viewed from the plane, is provided on each corner portion of the outer peripheral wall 3a. An inner peripheral surface 13a of each magnet 13 is substantially arc-shaped, and the spaces between the inner peripheral walls 3b and the inner peripheral surfaces 13a of the respective magnets 13 are equally formed.

In this embodiment, each magnet 13, which is substantially triangularly shaped as viewed from the plane, is fitted into the corner portion of the outer peripheral wall 3a of the yoke 3. Accordingly, in attaching the magnets 13 to the yoke 3, the magnets 13 can be positioned by only fitting the magnets 13 into the corner portions of the outer peripheral walls 3a and the fixture of the magnets 13 can be attained with a simple adhesion.

Since each magnet 13, which is substantially triangularly shaped as viewed from the plane, is fitted into the corner portion (the first corner portion 14a, the second corner portion 14b, the third corner portion 14c, the fourth corner portion 14d) of the outer peripheral wall 3a, a distance between a vertex 13b of the triangle of the magnet 13 and a side 13a opposing to the vertex 13b can be increased to make it possible to enhance the magnetic flux density of the magnet 13. As a result, it is possible to improve the driving force of the carrier 7.

Figure 8:
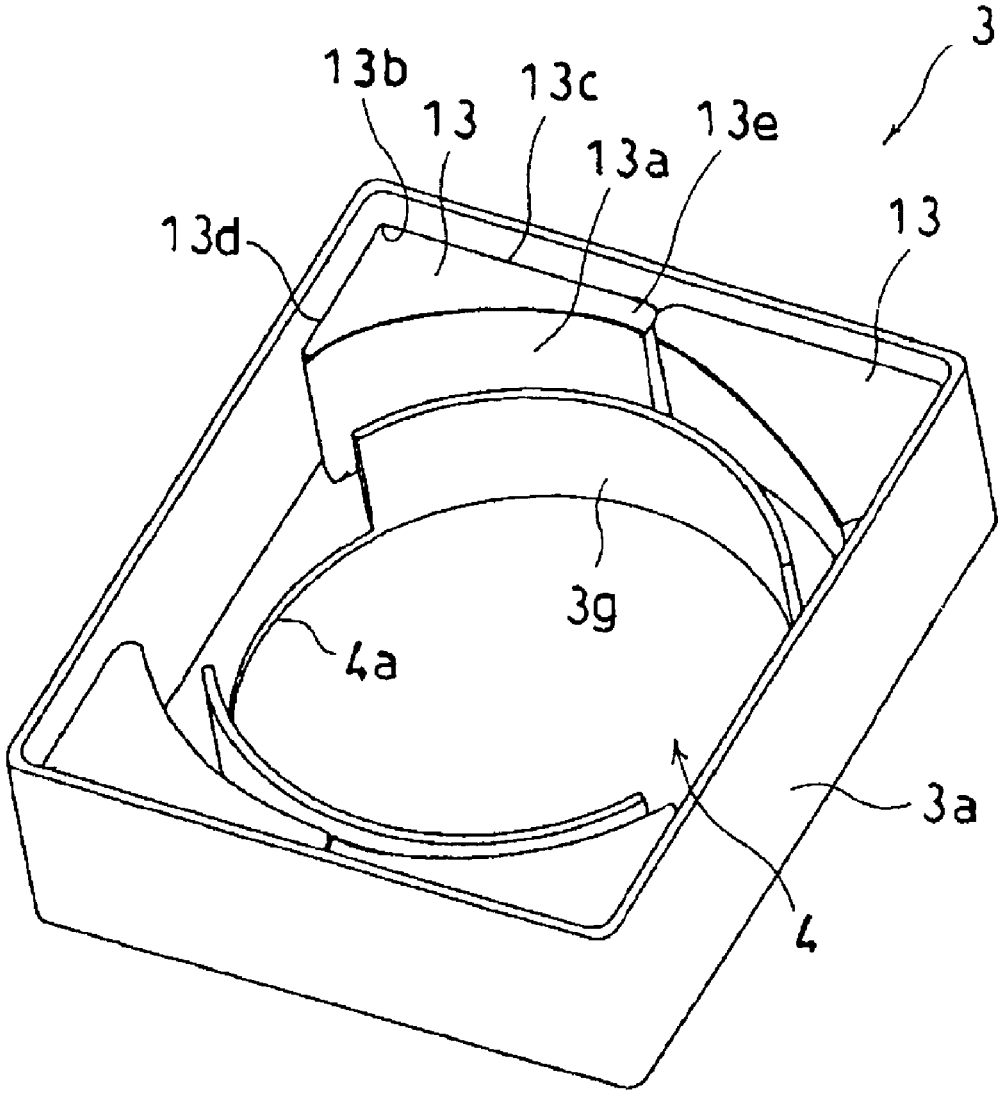
FIG. 8 is a perspective view illustrating a yoke extracted from a lens driving apparatus according to a third embodiment.
Figure 9:
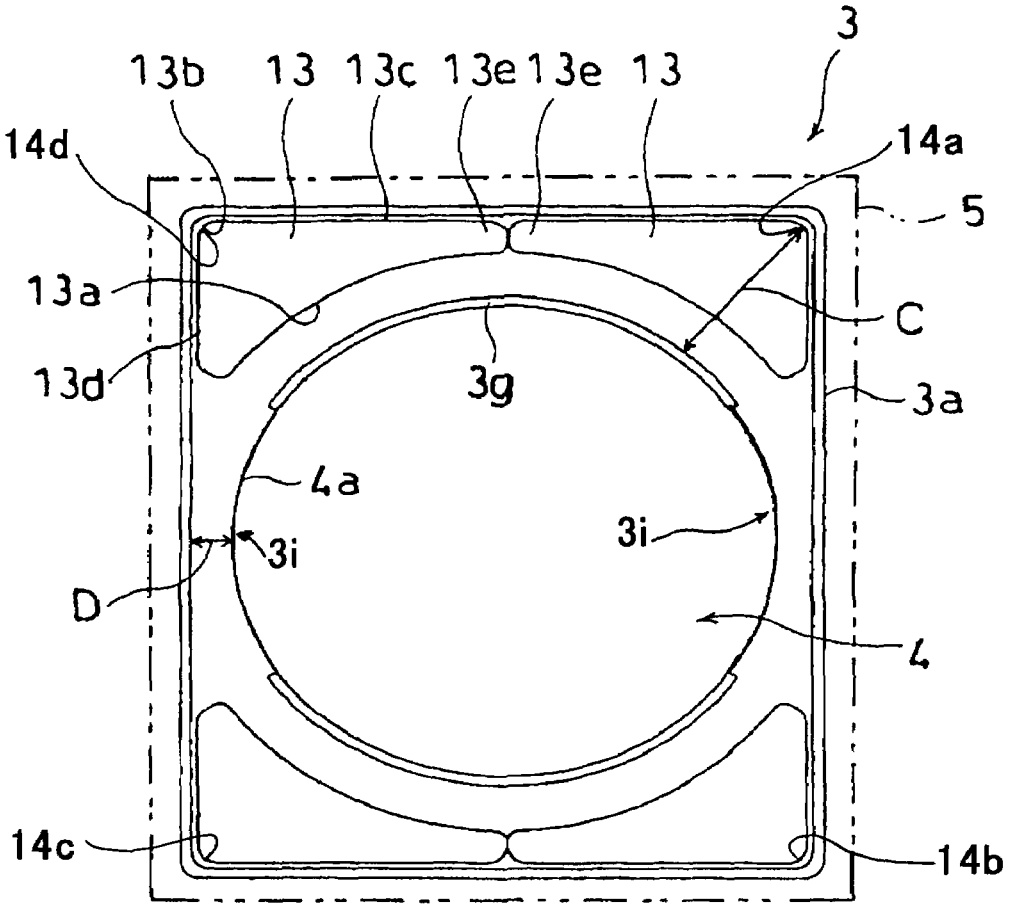
FIG. 9 is a plane view of the yoke illustrated in FIG. 8.

An explanation will be given next of a third embodiment using FIGS. 8 and 9. FIG. 8 is a perspective view illustrating a yoke extracted from a lens driving apparatus according to a third embodiment; and FIG. 9 is a plane view of the yoke illustrated in FIG. 8.

In the third embodiment, each magnet 13, which is substantially triangularly shaped as viewed from the plane, is fitted into the corner portion of the outer peripheral wall 3a, and an inner side wall 3g, which is arc-shaped as viewed from the plane, is provided on an edge 4a of the opening portion 4 where each magnet 13 opposes. Moreover, in connection with each magnet 13, one side 13c of the triangle abutting to the outer peripheral wall 3a is longer than the other side 13d and end portions 13e of adjacent two magnets 13 are abutted to each other.

Since each magnet 13 may not be placed at the base side portion, a space (D shown in FIG. 9) between the outer peripheral wall 3a and the edge 4a of the opening portion 4, which are positioned at the base side portion, can be made narrower than a space (C shown in FIG. 9) between the outer peripheral wall 3a and the inner side wall 3g, which are positioned at the base corner portion. As a result, the outer dimension of the base 5 can be reduced to make it possible to miniaturize the lens driving apparatus 1.

In the present embodiment, the arc-shape inner side wall 3g is formed on only the edge 4a of the opening portion 4 where the magnet 13 opposes. On the edge 4a of the opening portion 4 where the outer peripheral wall 3a, on which no magnet 13 is provided, opposes, space portion 3i is formed with no wall. Space portion 3i is positioned between the first corner portion 14a and the second corner portion 14b or the third corner portion 14c and the fourth corner portion 14d, where no magnet 13 is provided. As a result, the amount of yokes 3 can be reduced by the portion where no inner side wall 3g is provided, thereby making it possible to achieve light weight and cost reduction.

In connection with each magnet 13 provided at each corner portion of the outer side wall 3a, the end portions 13e of adjacent two magnets 13 are abutted to each other to restrict movement of each magnet 13 to the horizontal direction. This makes it possible to fix the magnet 13 fitted into the corner portion of the outer peripheral wall 3a with easier adhesion.

In addition, the present invention is not limited to the aforementioned embodiments. It is needless to say that various embodiments and changes may be possible without departing from the gist of the present invention. In the aforementioned first embodiment, one magnet 13 is provided on the outer peripheral wall 3a of the yoke 3. However, the present invention is not limited to this, and multiple magnets 13 may be arranged thereon in the direction of the optical axis.

In the aforementioned second embodiment, the magnet 13, which is substantially triangularly shaped as viewed from the plane, is provided at the corner portion of the yoke 3. However, the present invention is not limited to this. A support portion, which is substantially triangularly shaped as viewed from the plane, is provided at the corner portion of the yoke 3, so that the magnet 13, which is substantially arc-shaped as viewed from the plane, may be adhered to the support portion.

In the aforementioned first and second embodiments, the inner peripheral wall 3a of the yoke 3 is annularly formed. However, the present invention is not limited to this and the inner side wall 3g may be formed on only the edge 4a of the opening portion 4 where the magnet 13 opposes.

The lens driving apparatus 1 may be used in a digital camera without being limited to the camera relating to the cellular phone.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

[1. A lens driving apparatus comprising:
a substantially cylindrical yoke;
a base to which the yoke is attached;
a carrier having a lens;
a coil provided on the carrier; and
four magnets,
wherein the carrier is moved in a direction of an optical axis of the lens by electromagnetic force generated by passing current through the coil,
wherein the base is substantially square-shaped as viewed from a plane,
wherein the yoke is placed at an inner position of the base,
wherein the yoke has an outer peripheral wall and an inner peripheral wall spaced apart from each other, the inner peripheral wall being annularly shaped,
wherein each of the magnets is placed between the outer peripheral wall and the inner peripheral wall, and at a position corresponding to a respective corner portion of the base, and
wherein a space between the outer peripheral wall and the inner peripheral wall positioned at each of a plurality of side portions of the base is made narrower than a space between the outer peripheral wall and the inner peripheral wall positioned at each of the corner portions of the base.]

[2. The lens driving apparatus according to claim 1,
wherein the outer peripheral wall of the yoke is substantially square-shaped as viewed from the plane,
wherein the outer peripheral wall has arc-wall portions, being placed at positions corresponding to the corner portions of the base and being substantially arc-shaped as viewed from the plane, and a flat wall portion being formed between the arc-wall portions and being flat as viewed from the plane, and
wherein each of the magnets, being arc-shaped as viewed from the plane, is fixed onto an inner peripheral side surface of a respective one of the arc-wall portions of the outer peripheral wall.]

[3. The lens driving apparatus according to claim 2, wherein the outer peripheral wall of the yoke has an engage projection portion that positions the base.]

[4. The lens driving apparatus according to claim 1,
wherein the outer peripheral wall of the yoke is substantially square-shaped as viewed from the plane, and
wherein each of the magnets, being substantially triangularly shaped as viewed from the plane, is fitted into a respective corner portion of the outer peripheral wall of the yoke.]

[5. The lens driving apparatus according to claim 1, wherein the outer peripheral wall of the yoke has an engage projection portion that positions the base.]

[6. A lens driving apparatus comprising:
a substantially cylindrical yoke;
a base to which the yoke is attached;
a carrier having a lens;
a coil provided on the carrier; and
four magnets,
wherein the carrier is moved in a direction of an optical axis of the lens by electromagnetic force generated by passing current through the coil,
wherein the base is substantially square-shaped as viewed from the plane,
wherein the yoke is placed at an inner position of the base,
wherein the yoke has an outer peripheral wall, being substantially square-shaped as viewed from the plane, and an opening portion, being arc-shaped as viewed from the plane, where the carrier is moved,
wherein each of the magnets, being substantially triangularly shaped as viewed from the plane, is fitted into a respective corner portion of the outer peripheral wall of the yoke, and
wherein an inner wall of the yoke is formed in a standing condition on only edges of the opening portion where the magnets oppose.]

*7. A lens driving apparatus comprising:*
*a substantially cylindrical yoke;*
*a base to which the yoke is attached;*
*a carrier for carrying a lens;*
*a coil provided on the carrier; and*
*four magnets,*
*wherein the carrier is moved in a direction of an optical axis of the lens by electromagnetic force generated by passing current through the coil,*
*wherein the base is substantially square-shaped as viewed from a plane,*
*wherein the yoke is placed at an inner position of the base,*
*wherein the yoke has an outer peripheral wall, being substantially square-shaped as viewed from the plane, and an opening portion, being arc-shaped as viewed from the plane, where the carrier is moved,*
*wherein each of the magnets is placed at a respective corner portion of the outer peripheral wall of the yoke.*

*8. The lens driving apparatus according to claim 7,*
*wherein the outer peripheral wall has arc-wall portions, being placed at positions corresponding to corner portions of the base and being substantially arc-shaped as viewed from the plane, and a flat wall portion being formed between the arc-wall portions and being flat as viewed from the plane, and*
*wherein each of the magnets, being arc-shaped as viewed from the plane, is fixed onto an inner peripheral side surface of a respective one of the arc-wall portions of the outer peripheral wall.*

*9. The lens driving apparatus according to claim 7, wherein each of the magnets, being substantially triangularly shaped as viewed from the plane, is fitted into the respective corner portion of the outer peripheral wall of the yoke.*

*10. The lens driving apparatus according to claim 7, wherein the outer peripheral wall of the yoke has an engage projection portion that positions the base.*

* * * * *